(12) United States Patent
Yamada et al.

(10) Patent No.: US 10,131,781 B2
(45) Date of Patent: Nov. 20, 2018

(54) POLYACETAL RESIN COMPOSITION, COMPOSITE MOLDING USING THE SAME, AND METHOD FOR PRODUCING THE SAME

(71) Applicants: MITSUBISHI ENGINEERING-PLASTICS CORPORATION, Tokyo (JP); JAPAN POLYETHYLENE CORPORATION, Tokyo (JP)

(72) Inventors: Ryusuke Yamada, Kanagawa (JP); Masayuki Nagai, Kanagawa (JP); Satoshi Nagai, Kanagawa (JP); Kunihiko Fujimoto, Kanagawa (JP); Kei Takahashi, Kanagawa (JP)

(73) Assignees: MITSUBISHI ENGINEERING-PLASTICS CORPORATION, Minato-ku, Tokyo (JP); JAPAN POLYETHYLENE CORPORATION, Chiyoda-ku, Tokyo (JP)

( * ) Notice: Subject to any disclaimer, the term of this patent is extended or adjusted under 35 U.S.C. 154(b) by 508 days.

(21) Appl. No.: 14/416,707

(22) PCT Filed: Aug. 1, 2013

(86) PCT No.: PCT/JP2013/070845
§ 371 (c)(1),
(2) Date: Jan. 23, 2015

(87) PCT Pub. No.: WO2014/021413
PCT Pub. Date: Feb. 6, 2014

(65) Prior Publication Data
US 2015/0183982 A1 Jul. 2, 2015

(30) Foreign Application Priority Data

Aug. 3, 2012 (JP) .................................. 2012-172590

(51) Int. Cl.
*B29C 65/40* (2006.01)
*C08L 59/00* (2006.01)
(Continued)

(52) U.S. Cl.
CPC ............ *C08L 59/00* (2013.01); *B29C 65/405* (2013.01); *B32B 27/00* (2013.01); *B32B 27/08* (2013.01);
(Continued)

(58) Field of Classification Search
CPC ....... B29C 65/405; B32B 27/00; B32B 27/08; B32B 27/32; B29K 2023/06
See application file for complete search history.

(56) References Cited

U.S. PATENT DOCUMENTS

| | | | |
|---|---|---|---|
| 5,247,022 A | 9/1993 | McKee et al. | |
| 7,618,714 B2 * | 11/2009 | Ziegler | B32B 7/12 428/501 |

(Continued)

FOREIGN PATENT DOCUMENTS

| | | |
|---|---|---|
| CN | 1867628 A | 11/2006 |
| JP | 6-49320 A | 2/1994 |

(Continued)

OTHER PUBLICATIONS

Yury Lipatov, Structure, Mechanical, and Rheological Properties of Polyethylene-Poly(oxymethylene) Blends, Mar. 9, 2003, Journal of Applied Polymer Science, vol. 22, Issue 7, pp. 1-16. (Year: 2003).*

(Continued)

*Primary Examiner* — Matthew J Daniels
*Assistant Examiner* — Kelsey C Grace
(74) *Attorney, Agent, or Firm* — Sughrue Mion, PLLC (57) ABSTRACT

The invention is a polyacetal resin composition containing a polyacetal resin (A) and a polyethylene resin (B), in which the blending proportion of the polyacetal resin (A) occupy- (Continued)

ing in the total mass of the polyacetal resin (A) and the polyethylene resin (B) is 10 to 90 mass %, the melt flow rate of the polyacetal resin (A) measured at a condition of 190° C. and 2.16 kg load is 30 g/10 minutes or less, and the polyethylene resin (B) consists of a modified polyethylene resin and the modification rate is 0.01 mass % or more based on 100 mass % of the total mass of the polyethylene resin and the melt flow rate of the polyethylene resin (B) measured at a condition of 190° C. and 2.16 kg load is 2.5 g/10 minutes or less.

3 Claims, 1 Drawing Sheet

(51) Int. Cl.
    *B32B 27/00*     (2006.01)
    *B32B 27/32*     (2006.01)
    *C08L 51/06*     (2006.01)
    *C08L 59/04*     (2006.01)
    *B32B 27/08*     (2006.01)
    *B32B 27/28*     (2006.01)
    *C08L 51/00*     (2006.01)
    *C09J 159/04*     (2006.01)
    *C08L 61/06*     (2006.01)
    *B29K 59/00*     (2006.01)

(52) U.S. Cl.
CPC .............. *B32B 27/28* (2013.01); *B32B 27/32* (2013.01); *C08L 51/003* (2013.01); *C08L 51/06* (2013.01); *C08L 59/04* (2013.01); *C08L 61/06* (2013.01); *C09J 159/04* (2013.01); *B29K 2023/06* (2013.01); *B29K 2059/00* (2013.01); *B32B 2250/02* (2013.01); *B32B 2250/24* (2013.01); *B32B 2270/00* (2013.01); *Y10T 428/31938* (2015.04)

(56) References Cited

U.S. PATENT DOCUMENTS

2001/0034407 A1   10/2001   Ariyasu et al.
2007/0129484 A1*   6/2007   Horio ...................... C08L 51/06
                                                        524/505

FOREIGN PATENT DOCUMENTS

| JP | 2002-138185 A | 5/2002 |
| JP | 2006-282903 A | 10/2006 |
| JP | 2007-084641 A | 4/2007 |
| JP | 4731022 B2 | 7/2011 |
| JP | 2011-225746 A | 11/2011 |
| WO | 2005/035652 A1 | 4/2005 |

OTHER PUBLICATIONS

Communication dated Jun. 6, 2017 issued by the Japanese Patent Office in counterpart application No. 2014-528215.
TAFMER™ M Meigara no Kihon Bussei, Mitsui Chemicals, Inc., Sep. 7, 2012.
International Search Report for PCT/JP2013/070845 dated Oct. 15, 2013.
Communication dated Oct. 29, 2015 from the State Intellectual Property Office of P.R. China in counterpart application No. 201380039920.8.
Communication dated Jan. 27, 2016, from the European Patent Office in counterpart European Application No. 13824922.2.
Communication dated Sep. 5, 2017 issue by the State Intellectual Property Office of People's Republic of China in counterpart application No. 201610121045.3.
Communication dated Jun. 4, 2018 from the State Intellectual Property Office of the P.R.C. In counterpart Chinese application No. 201610121045.3.
Um, I., et al., "Tribiological Properties of Polyacetal/Polyethylene (LDPE, HDPE, HMWHDPE) Blends", J. Soc. Mat. Sci., Japan, vol. 50, No. 3, pp. 309-315, 2001.
Rui, H., et al., "Plastic engineering handbook, vol. 1", China Machine Press, first edition, Apr. 2000, p. 238.
Shijun, Z., et al., "Polyethylene resin and its application", Chemical Industry Press, first edition, Nov. 2011, 2 pages.
Communication dated Aug. 28, 2018 from the Japanese Patent Office in counterpart Application No. 2017-221439.

* cited by examiner

Fig.1

POLYACETAL RESIN COMPOSITION, COMPOSITE MOLDING USING THE SAME, AND METHOD FOR PRODUCING THE SAME

CROSS REFERENCE TO RELATED APPLICATIONS

This application is a National Stage of International Application No. PCT/JP2013/070845filed Aug. 1, 2013 claiming priority based on Japanese Patent Application No. 2012-172590filed Aug. 3, 2012, the contents of all of which are incorporated herein by reference in their entirety.

TECHNICAL FIELD

The invention relates to a polyacetal resin composition, a composite molding using the same and a method of producing the same.

BACKGROUND ART

A polyacetal resin, which is an engineering plastic, is excellent in mechanical properties, electrical characteristics, sliding property, and chemical resistance, and thus, is widely used for, for example, automobile parts, electrical and electric equipment parts, OA parts, and the like. Among these, in particular, as use of the polyacetal resin utilizing excellent chemical resistance thereof, a flange, a valve, a tube, and the like which are connected to the fuel tank of an automobile, and parts for connecting a fuel tank that is in direct contact with fuel are exemplified.

On the other hand, in recent years, a polyethylene resin is used as a material for a fuel tank of an automobile for the purpose of improving fuel efficiency through weight saving of the body of the automobile.

Herein, as a method of installing parts for connecting a fuel tank made of the polyacetal resin to a fuel tank using a polyethylene resin, for example, a method of welding the polyacetal resin with the polyethylene resin, and the like are known. However, the method had problems such that the welding property of the interface between the polyacetal resin and the polyethylene resin is usually low, and the welding portion is easily separated by external force, and thus volatile fuel leaks out from the interface between the resins. Particularly, fuel has high volatility and can be a cause of air pollution, and thus such leakage of fuel is globally regulated. Accordingly, development of a polyacetal resin composition strongly adhering to a polyacetal resin and a polyethylene resin is strongly desired.

As an example of such a polyacetal resin composition, Patent Document 1 below discloses a resin composition obtained by blending a polyacetal resin and a polyethylene resin. Patent Document 1 below further discloses that a polyacetal resin has a proportion with respect to the total mass of the polyacetal resin and a polyethylene resin of 5 to 80 weight % and a melt flow rate of 0.1 to 200 g/10 minutes, and that as a polyethylene resin, a maleic anhydride-modified high density polyethylene having a maleic anhydride modification rate of 0.3% and a melt flow rate of 3.0 are used.

CITATION LIST

Patent Document

Patent Document 1: JP 4731022 B1

SUMMARY OF THE INVENTION

Problem to be Solved by the Invention

However, the polyacetal resin composition disclosed in the Patent Document 1 described above exhibits insufficient adhesive property with a polyacetal-based resin. Therefore, a polyacetal resin composition is desired, which has excellent adhesive property with respect to any one of a polyacetal resin molding containing a polyacetal resin and a polyethylene resin molding containing a polyethylene resin.

The invention has been made in view of the circumstances described above, and an object of the present invention is to provide a polyacetal resin composition having excellent adhesive property with respect to any one of a polyacetal resin molding containing a polyacetal resin and a polyethylene resin molding containing a polyethylene resin, a composite molding using the same and a method of producing the same.

Means for Solving Problem

The inventors earnestly researched to solve the problems described above, and as a result, found out that setting the value of the melt flow rate of a polyethylene resin to a specific range is extremely important in order to improve the adhesive property of a resin composition with respect to a polyacetal resin molding and a polyethylene resin molding. Then, the inventors further earnestly researched, and as a result, found out that the problems described above can be solved by the invention below.

In other words, the present invention is a polyacetal resin composition containing a polyacetal resin (A) and a polyethylene resin (B), in which the blending proportion of the polyacetal resin (A) occupying in the total mass of the polyacetal resin (A) and the polyethylene resin (B) is 10 to 90 mass %, the melt flow rate of the polyacetal resin (A) measured at a condition of 190° C. and 2.16 kg load is 30 g/10 minutes or less; the polyethylene resin (B) contains a modified polyethylene resin, the modification rate is 0.01 mass % or more based on 100 mass % of the total mass of the polyethylene resin (B), and the melt flow rate of the polyethylene resin (B) measured at a condition of 190° C. and 2.16 kg load (hereinafter, referred to as "MFR" in the specification) is 2.5 g/10 minutes or less.

According to this polyacetal resin composition, it is possible for the polyacetal resin composition to have excellent adhesive property with respect to any one of a polyacetal resin molding containing a polyacetal resin and a polyethylene resin molding containing a polyethylene resin.

In the polyacetal resin composition described above, the polyethylene resin (B) may contain one or more kinds of unmodified polyethylene resins in addition to the modified polyethylene resin. At this time, the proportion of the modified polyethylene resin in the polyethylene resin (B) is preferably 1 to 100 mass %, and further preferably 20 to 100 mass %.

In the polyacetal resin composition described above, MFR of the polyethylene resin (B) measured at a condition of 190° C. and 2.16 kg load is preferably 0.01 to 2.0 g/10 minutes.

In this case, it is possible for the polyacetal resin composition to have further excellent adhesive property with respect to any one of a polyacetal resin molding containing a polyacetal resin and a polyethylene resin molding containing a polyethylene resin in comparison to the case where MFR of the polyethylene resin (B) is out of the range of 0.01 to 2.0 g/10 minutes.

In the polyacetal resin composition described above, MFR of the polyacetal resin (A) measured at a condition of 190° C. and 2.16 kg load is preferably 20 g/10 minutes or less.

In this case, it is possible for the polyacetal resin composition to have further excellent adhesive property with respect to a polyacetal resin molding in comparison to the case where MFR is beyond 20 g/10 minutes.

In the polyacetal resin composition described above, MFR of the polyacetal resin (A) measured at a condition of 190° C. and 2.16 kg load is preferably 10 g/10 minutes or less.

In this case, it is possible for the polyacetal resin composition to have further excellent adhesive property with respect to a polyacetal resin molding in comparison to the case where MFR is beyond 10 g/10 minutes.

In the polyacetal resin composition described above, the density of the polyethylene resin (B) is preferably 0.954 g/cm$^3$ or less.

In this case, it is possible for the polyacetal resin composition to have further excellent adhesive property with respect to a polyacetal resin molding in comparison to the case where the density of the polyethylene resin (B) is beyond 0.954 g/cm$^3$.

In addition, in the polyacetal resin composition described above, it is preferred that the polyacetal resin (A) contains an oxymethylene group and an oxyethylene group, and the content of the oxyethylene group based on 100 mole of the oxymethylene group is 1.0 mole or more.

In this case, it is possible for the polyacetal resin composition to have further excellent adhesive property with respect to a polyethylene resin molding in comparison to the case where the content of the oxyethylene group is less than 1.0 mole.

In addition, in the polyacetal resin composition described above, the modified polyethylene resin contained in the polyethylene resin (B) is preferably a maleic anhydride-graft modified polyethylene resin.

In this case, the polyacetal resin composition exhibits excellent compatibility with a polyacetal resin and dispersibility when the polyacetal resin is melting-kneaded without promotion of the decomposition of the polyacetal resin, in comparison to the case where the modified polyethylene resin is other than the maleic anhydride-graft modified polyethylene resin.

In addition, the present invention is a composite molding having a polyacetal resin molding containing a polyacetal resin, a polyethylene resin molding containing a polyethylene resin, and an intermediate layer provided between the polyacetal resin molding and the polyethylene resin molding, in which the intermediate layer consists of the polyacetal resin composition described above.

According to this composite molding, the intermediate layer consists of the polyacetal resin composition described above, and the adhesive property between a polyacetal resin molding containing a polyacetal resin and a polyethylene resin molding containing a polyethylene resin can be sufficiently improved, and thus separation between the polyacetal resin molding and the polyethylene resin molding can be sufficiently suppressed. Accordingly, the lifetime of the composite molding can be prolonged, and the replacement frequency can be sufficiently reduced.

In addition, the present invention is a method of producing the composite molding described above, which includes a first process of preparing the intermediate layer, a second process of preparing the polyacetal resin molding, and a third process of preparing the polyethylene resin molding, and produces the composite molding through the first process, the second process and the third process.

In this case, in the obtained composite molding, separation between the polyacetal resin molding and the polyethylene resin molding can be sufficiently suppressed, the improvement of the lifetime is possible, and the replacement frequency can be sufficiently reduced.

In the method of producing the composite molding described above, it is preferred that the first process is performed before the second process and the third process, and the second process is a process of preparing the polyacetal resin molding by bringing the polyacetal resin in molten state into contact with the intermediate layer to form the polyacetal resin molding on the intermediate layer, and the third process is a process of preparing the polyethylene resin molding by bringing the polyethylene resin in molten state into contact with the intermediate layer to form the polyethylene resin molding on the intermediate layer.

In this case, in the obtained composite molding, it is possible to further improve the adhesion strength between the intermediate layer and the polyacetal resin molding, and the adhesion strength between the intermediate layer and the polyethylene resin molding in comparison to the case where the first process is not performed before the second process and the third process.

In the method of producing the composite molding described above, specifically, the first process, the second process and the third process may be performed by a three-color molding or an insert molding.

Effect of the Invention

According to the present invention, provided are a polyacetal resin composition having excellent adhesive property with respect to any one of a polyacetal resin molding containing a polyacetal resin and a polyethylene resin molding containing a polyethylene resin, a composite molding using the same and a method of producing the same.

MODE(S) FOR CARRYING OUT THE INVENTION

Hereinafter, an embodiment of the composite molding of the present invention will be explained in detail with reference to FIG. 1.

Figure 1:
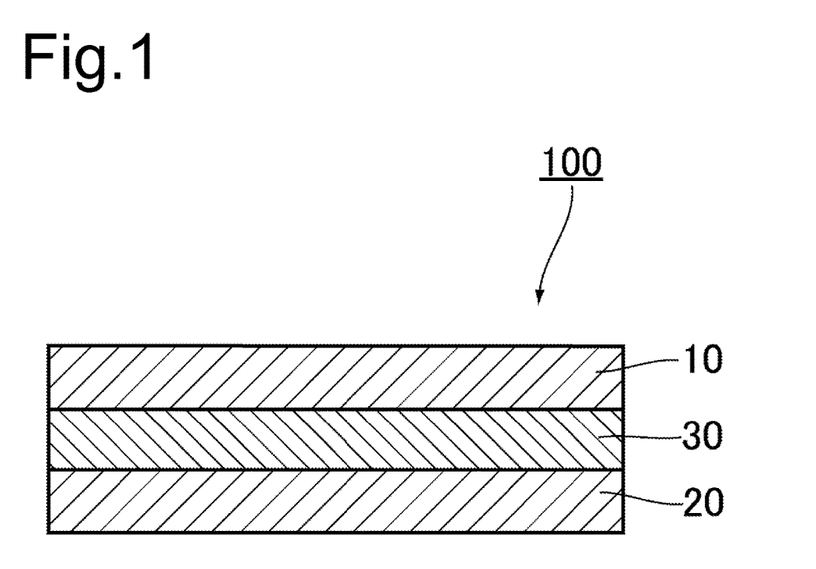
FIG. 1 is a sectional drawing that illustrates a composite molding of the present invention.

As illustrated in FIG. 1, the composite molding 100 has a polyacetal resin molding 10 containing a polyacetal resin, a polyethylene resin molding 20 containing a polyethylene resin, and an intermediate layer 30 that is provided between the polyacetal resin molding 10 and the polyethylene resin molding 20 and bonds the polyacetal resin molding 10 to the polyethylene resin molding 20.

The intermediate layer 30 consists of a polyacetal resin composition containing a polyacetal resin (A) and a polyethylene resin (B). In this polyacetal resin composition, the blending proportion of the polyacetal resin (A) occupying in the total mass of the polyacetal resin (A) and the polyethylene resin (B) is 10 to 90 mass %, MFR thereof measured at a condition of 190° C. and 2.16 kg load is 30 g/10 minutes or less; the polyethylene resin (B) contains a modified polyethylene resin, the modification rate is 0.01 mass % or more based on 100 mass % of the total mass of the polyethylene resin (B), and MFR of the polyethylene resin (B) measured at a condition of 190° C. and 2.16 kg load is 2.5 g/10 minutes or less.

The intermediate layer 30 consists of the polyacetal resin composition described above, and this polyacetal resin composition has excellent adhesive property with respect to any one of the polyacetal resin molding and the polyethylene resin molding. Therefore, according to the composite molding 100, separation between the polyacetal resin molding 10 and the polyethylene resin molding 20 can be sufficiently suppressed. Accordingly, when the composite molding 100 is used, for example, as a fuel transport part, the release of volatilized fuel through a gap generated by the separation between the polyacetal resin molding 10 and the polyethylene resin molding 20 can be sufficiently suppressed.

Next, the polyacetal resin molding 10, the polyethylene resin molding 20, and the intermediate layer 30 described above will be explained in detail.

(Polyacetal Resin Molding)

The polyacetal resin contained in the polyacetal resin molding 10 is not particularly limited if it is a polyacetal resin having a divalent oxymethylene group, and may be a homopolymer containing a divalent oxymethylene group only as a constitutional unit, or may be a copolymer containing, for example, a divalent oxymethylene group and a divalent oxyethylene group as constitutional units.

In the polyacetal resin described above, the proportion of the oxyethylene group occupying in the total mass of the oxymethylene group and the oxyethylene group is not particularly limited, and the content of oxyethylene based on 100 mole of the oxymethylene group may be, for example, 0 to 5 mol.

Trioxane is ordinarily used as a main raw material to produce the polyacetal resin described above. In addition, in order to introduce the oxyethylene group into the polyacetal resin, for example, 1,3-dioxolane, ethylene oxide, or the like may be used as a comonomer.

MFR of the polyacetal resin described above is not also particularly limited, and the value of MFR measured at a condition of 190° C. and 2.16 kg load may be, for example, 0.1 to 200 g/10 minutes.

The polyacetal resin molding 10 may contain a polyacetal resin. Therefore, the polyacetal resin molding 10 may consist of a polyacetal resin only, or may consist of a polyacetal resin and an additive. As the additive, for example, a thermal stabilizer, an antioxidant, a weathering stabilizer, a mold-releasing agent, a lubricant, a crystal nucleating agent, an antistatic agent, an inorganic filler, a pigment, or the like may be blended.

(Polyethylene Resin Molding)

The polyethylene resin contained in the polyethylene resin molding 20 described above is not also particularly limited, and, for example, a high density polyethylene resin, a middle density polyethylene resin, a high pressure low density polyethylene resin, a linear low density polyethylene resin, an ultra-low density polyethylene resin, or the like may be used. The polyethylene resin molding 20 may contain a polyethylene resin. Therefore, the polyethylene resin molding 20 may consist of a polyethylene resin only, or may consist of a polyethylene resin and an additive. As the additive, for example, a thermal stabilizer, an antioxidant, a weathering stabilizer, a mold-releasing agent, a lubricant, a crystal nucleating agent, an antistatic agent, an inorganic filler, a pigment, or the like may be blended.

(Intermediate Layer)

(A) Polyacetal Resin

The polyacetal resin (A) contained in the polyacetal resin composition constituting the intermediate layer 30 described above may be a homopolymer containing a divalent oxymethylene group only as a constitutional unit, or a copolymer containing a divalent oxymethylene group and a divalent oxyethylene group as constitutional units, but is preferably a copolymer containing a divalent oxyethylene group as a constitutional unit. When the polyacetal resin (A) is a copolymer containing a divalent oxyethylene group as a constitutional unit, it is excellent in thermal stability at the time of the melting-kneading and at the time of the injection molding.

Herein, the content of the oxyethylene group based on 100 mole of the oxymethylene group in the polyacetal resin (A) described above is preferably 1.0 mole or more. In this case, it is possible for the polyacetal resin composition to have further excellent adhesive property with respect to the polyethylene resin molding in comparison to the case where the proportion of the oxyethylene group is less than 1.0 mol. The proportion of the oxyethylene group is further preferably 1.2 to 5.5 mol, and particularly preferably 1.4 to 4.0 mol.

Trioxane is ordinarily used as a main raw material to produce the polyacetal resin (A) described above. In addition, in order to introduce the oxyethylene group into the polyacetal resin, for example, 1,3-dioxolane, ethylene oxide, or the like may be used as a comonomer.

MFR of the polyacetal resin (A) described above measured at a condition of 190° C. and 2.16 kg load is 30 g/10 minutes or less as described above.

If MFR is beyond 30 g/10 minutes, the polyacetal resin molding 10 and the intermediate layer 30 do not have excellent adhesive property to each other, and the separation of the polyacetal resin molding 10 and the intermediate layer 30 cannot be sufficiently suppressed. MFR of the polyacetal resin (A) is further preferably 20 g/10 minutes or less, and particularly preferably 10 g/10 minutes or less. However, MFR of the polyacetal resin (A) is preferably greater than 0 g/10 minutes, more preferably 1.5 g/10 minutes or more, and further preferably 2.0 g/10 minutes or more.

(B) Polyethylene Resin

The polyethylene resin (B) contained in the polyacetal resin composition constituting the intermediate layer 30 described above contains the modified polyethylene resin as described above. Herein, the modified polyethylene resin refers to a polyethylene resin that is graft modified with an acid or acid anhydride.

The modified polyethylene resin pertaining to the present invention is produced by uniformly mixing and treating a polyethylene resin, an acid or acid anhydride and a radical generator. Examples of such a production method include, specifically, a melting-kneading method using an extruder, a Banbury mixer, a kneader, or the like; a solution method by dissolution in a suitable solvent, a slurry method by suspension in a suitable solvent, or so-called a vapor graft method, or the like. The treatment temperature is suitably selected in consideration of deterioration of the polyethylene resin, decomposition of the acid or acid anhydride, the decomposition temperature of the peroxide to be used, or the like, but ordinarily 190 to 350° C., and particularly suitably 200 to 300° C., when the production method is the melting-kneading method.

A method of removing unreacted monomers (an unsaturated carboxylic acid and a derivative thereof), various by-produced components, or the like by heating, washing, or the like may be adopted in production of the modified polyethylene resin pertaining to the present invention.

Examples of the radical generator used in the graft-modification include organic peroxides such as dicumyl peroxide, benzoyl peroxide, di-t-butyl peroxide, 2,5-dimethyl-2,5-di(t-butylperoxy)hexane, 2,5-dimethyl-2,5-di(t-butylperoxy)hexyne-3, 2,5-dimethyl-2,5-di(t-butylperoxy) hexane, lauroyl peroxide, t-butyl peroxybenzoate, 1,1,3,3-tetramethylbutyl hydroperoxide, diisopropyl benzene hydroperoxide, t-butylcumyl peroxide, α,α'-bis(t-butylperoxy-m-isopropyl)benzene, di t-butyl diperoxyisophthalate, n-butyl-4,4-bis(t-butylperoxy)valerate, t-butyl peroxybenzoate, t-butyl peroxyacetate, cyclohexanone peroxide, t-butyl peroxylaurate and acetyl peroxide. Among these, preferred are those having 160 to 200° C. of the decomposition temperature for obtaining a half-life of one minute. If the decomposition temperature is too low, the decomposition reaction starts before the polyethylene resin (A) of the raw material is sufficiently plasticized in the extruder, and thus the reaction rate decreases. Reversely, if the decomposition temperature is too high, the reaction is not completed in the extruder, or the like, and the amounts of unreacted unsaturated carboxylic acids and derivatives thereof increase.

Examples of the polyethylene resin that is the subject for the modification include a high density polyethylene resin, a middle density polyethylene resin, a high pressure low density polyethylene resin, a linear low density polyethylene resin, an ultra-low density polyethylene resin, or the like. One kind thereof may be used singly, or two or more kinds thereof may be used in combination.

Examples of the acid modifying the polyethylene resin include unsaturated carboxylic acids such as acrylic acid, methacrylic acid, α-ethylacrylic acid, maleic acid, fumaric acid, itaconic acid, citraconic acid and tetrahydrophthalic acid. One kind thereof may be used singly, or two or more kinds thereof may be used in combination.

Examples of the acid anhydride modifying the polyethylene resin include unsaturated carboxylic anhydrides such as maleic anhydride, citraconic anhydride, itaconic anhydride, tetrahydrophthalic anhydride, nadic anhydride and methylnadic anhydride. One kind thereof may be used singly, or two or more kinds thereof may be used in combination.

Among the modified polyethylene resins described above, particularly preferred is a maleic anhydride-graft modified polyethylene resin. In this case, decomposition of the polyacetal resin can be further sufficiently suppressed and the compatibility with the polyacetal resin and the dispersibility is excellent when the polyacetal resin is melting-kneaded, in comparison to the case where the modified polyethylene resin is other than the maleic anhydride-graft modified polyethylene resin.

The polyethylene resin (B) may contain one or more kinds of unmodified polyethylene resins in addition to the modified polyethylene resin. At this time, the proportion of the modified polyethylene resin in the polyethylene resin (B) is preferably 1 to 100 mass %, and further preferably 20 to 100 mass %.

Examples of the unmodified polyethylene resin include a high density polyethylene resin, a middle density polyethylene resin, a high pressure low density polyethylene resin, a linear low density polyethylene resin, an ultra-low density polyethylene resin, or the like.

The modification rate of the polyethylene resin (B) described above is 0.01 mass % or more with respect to the total mass of the polyethylene resin as described above. If the modification rate is less than 0.01 mass %, the polyacetal resin molding 10 and the intermediate layer 30 cannot have excellent adhesive property to each other, and the separation of the polyacetal resin molding 10 and the intermediate layer 30 cannot be sufficiently suppressed. The modification rate of the polyethylene resin (B) is preferably 0.05 to 2.0 mass %, and further preferably 0.10 to 1.0 mass %. Herein, the modification rate of the polyethylene resin (B) described above is defined as follow. In other words, the modification rate of the polyethylene resin (B) is defined as the proportion (percent) by mass parts of the acid or acid anhydride grafted to the polyethylene molecule with respect to 100 mass parts of the polyethylene resin.

The density of the polyethylene resin (B) described above is preferably 0.954 g/cm$^3$ or less. In this case, it is possible for the polyacetal resin composition to have further excellent adhesive property with respect to the polyacetal resin molding 10 in comparison to the case where the density is beyond 0.954 g/cm$^3$. The density of the polyethylene resin (B) described above is further preferably 0.912 to 0.945 g/cm$^3$. Herein, the density of the polyethylene resin (B) described above is measured by the method in accordance with JIS K7112.

MFR of the polyethylene resin (B) described above measured at a condition of 190° C. and 2.16 kg load is 2.5 g/10 minutes or less as described above. Herein, the MFR of the polyethylene resin (B) described above is measured by the method in accordance with ASTM-D1238 standards.

If MFR is beyond 2.5 g/10 minutes, the polyacetal resin molding 10 and the intermediate layer 30 cannot have excellent adhesive property to each other, and the separation of the polyacetal resin molding 10 and the intermediate layer 30 cannot be sufficiently suppressed. MFR of the polyethylene resin (B) is preferably 0.01 to 2.0 g/10 minutes, and particularly preferably 0.01 to 1.8 g/10 minutes.

In the intermediate layer 30 described above, the blending proportion of the polyacetal resin (A) occupying in the total mass of the polyacetal resin (A) and the polyethylene resin (B) is 10 to 90 mass % as described above.

If the blending proportion of the polyacetal resin (A) is less than 10 mass %, the polyacetal resin molding 10 and the intermediate layer 30 cannot have excellent adhesive property to each other, and the separation of the polyacetal resin molding 10 and the intermediate layer 30 cannot be sufficiently suppressed. On the other hand, if the blending proportion of the polyacetal resin (A) is beyond 90 mass %, the polyethylene resin molding 20 and the intermediate layer 30 cannot have excellent adhesive property to each other, and the separation of the polyethylene resin molding 20 and the intermediate layer 30 cannot be sufficiently suppressed. The blending proportion of the polyacetal resin (A) occupying in the total mass of the polyacetal resin (A) and the polyethylene resin (B) is preferably 10 to 80 mass %, and further preferably 20 to 70 mass %.

(C) Other Components

A modifier may be further contained in the polyacetal resin composition constituting the intermediate layer 30. Herein, examples of the modifier include isocyanates, or the like. Examples of the isocyanate specifically include monovalent isocyanate compounds such as methyl isocyanate, ethyl isocyanate, propyl isocyanate, butyl isocyanate, hexyl isocyanate, octyl isocyanate, decyl isocyanate, dodecyl isocyanate, hexadecyl isocyanate, octadecyl isocyanate, eicosyl isocyanate, methacrylate ethyl 2-isocyanate and phenyl isocyanate; divalent isocyanate compounds such as methylene diisocyanate, ethylene diisocyanate, trimethylene diisocyanate, tetramethylene diisocyanate, hexamethylene diisocyanate, octamethylene diisocyanate, decamethylene diisocyanate, dodecamethylene diisocyanate, hexadecamethylene diisocyanate, eicosamethylene diisocyanate, methylene bis (4,1-cyclohexanediyl)diisocyanate or a carbodiimide-modified body thereof, 4,4'-diphenyl methanediisocyanate or a carbodiimide-modified body thereof, 1,5-naphthalene diyl-diisocyanate and 3,3'-dimethylbiphenyl-4,4'-diyl diisocyanate, or the like. The modifier is blended preferably in 0.05 to 5.0 mass parts, more preferably in 0.1 to 1.0 mass parts with respect to 100 mass parts of the sum of the polyacetal resin and the polyethylene resin. In this case, an advantage of improvement in the toughness and the adhesive property of the intermediate layer 30 is obtained.

Next, a method of producing the composite molding 100 will be explained in detail.

The method of producing the composite 100 includes a first process of preparing the intermediate layer 30, a second process of preparing the polyacetal resin molding 10 and a third process of preparing the polyethylene resin molding 20, and produces the composite molding 100 through the first process, the second process and the third process. Herein, the sequence of the first process, the second process and the third process does not matter. In other words, the first process, the second process and the third process may be performed sequentially, or the second process, the first process and the third process may be performed sequentially, or the third process, the first process and the second process may be performed sequentially. In addition, the first process, the second process and the third process may be also performed at the same time.

Specifically, the composite molding 100 is produced by a method in which the polyacetal resin molding 10, the intermediate layer 30 and the polyethylene resin molding 20 are molded, respectively, and then they are welded to each other; a method in which the polyacetal resin molding 10 and the intermediate layer 30 are two-color molded to form a two-color molding, and then the two-color molding is welded with the polyethylene resin molding 20; a method in which the polyethylene resin molding 20 and the intermediate layer 30 are two-color molded to form a two-color molding, and then the two-color molding is welded with the polyacetal resin molding 10; a method in which the polyacetal resin molding 10, the intermediate layer 30 and the polyethylene resin molding 20 are three-color molded; a method in which the intermediate layer 30 is prepared and then the polyacetal resin molding 10 and the polyethylene resin molding 20 are formed on both sides of the intermediate layer 30, respectively, or the like. Among these, particularly preferred is a method in which the polyacetal resin molding 10, the intermediate layer 30 and the polyethylene resin molding 20 are three-color molded to form the composite molding 100 from the viewpoint of the productivity.

Herein, the method in which the polyacetal resin molding 10, the intermediate layer 30 and the polyethylene resin molding 20 are three-color molded to produce the composite molding 100 will be explained.

First, three common dies having an identical shape are placed on a rotating plate. On the other hand, a primary die, a secondary die and a tertiary die having different shapes from each other are prepared. The primary die is used for producing the polyacetal resin molding 10 together with the common die, and the secondary die is used for producing the intermediate layer 30 together with the common die and the polyacetal resin molding 10. The tertiary die is used for producing the polyethylene resin molding 20 together with the common die, the polyacetal resin molding 10 and the intermediate layer 30.

First of all, the polyacetal resin molding 10 is produced with one of the common dies and the primary die (the second process). Next, the rotating plate is rotated, and the polyacetal resin composition for forming the intermediate layer is supplied while being heated into the space formed by the polyacetal resin molding 10, the common die, and the secondary die, and then cooled.

In this way, the intermediate layer 30 is formed on the polyacetal resin molding 10, and the structure is obtained (the first process).

Next, the rotating plate is rotated, and the raw materials for forming the polyethylene resin molding 20 is supplied while being heated into the space formed by the structure, the common die and the tertiary die, and then cooled.

In this way, the polyethylene resin molding 20 is formed on the intermediate layer 30 of the structure (the third process), and the composite molding 100 is obtained.

Meanwhile, in the production methods above, the sequence of the second process and the third process may be changed.

In addition, among the production methods described above, preferred is a method in which the intermediate layer 30 is prepared, and then the polyacetal resin molding 10 and the polyethylene resin molding 20 are formed on both sides of the intermediate layer 30, respectively from the viewpoint of suppressing the separation between the layers in the composite molding 100.

Herein, this production method will be explained in detail.

In this production method, first, the intermediate layer 30 is prepared (the first process).

Next, the polyacetal resin in molten state is brought into contact with the intermediate layer 30 to form the polyacetal resin molding 10 on the intermediate layer 30 whereby to prepare the polyacetal resin molding 10 (the second process).

Next, the polyethylene resin in molten state is brought into contact with the intermediate layer 30, to form the polyethylene resin molding 20 on the intermediate layer 30 whereby to prepare the polyethylene resin molding 20 (the third process).

In this way, the composite molding 100 is obtained.

According to this production method, in the obtained composite molding 100, it is possible to further improve the adhesion strength between the intermediate layer 30 and the polyacetal resin molding 10, and the adhesion strength between the intermediate layer 30 and the polyethylene resin molding 20 in comparison to the case where the first process is not performed before the second process and the third process.

In the production method above, the sequence of the second process and the third process may be changed, and the second process and the third process may be performed at the same time.

The first process, the second process and the third process described above may be performed specifically by the three-color molding or the insert molding.

The composite molding of the present invention may be applied, for example, to a valve device, a re-circulation line, a vent line, a flange for a fuel sender module, and a connecting part for a fuel tank such as a swirl baffle plate oil sump bonded to the internal wall surface of a fuel tank, or the like.

In addition, although the polyacetal resin composition of the present invention constitutes the intermediate layer 30 of the composite molding 100 in the embodiment described above, the polyacetal resin composition of the present invention may be applied not only as a material constituting the intermediate layer 30 of the composite molding 100 but also be applied as an adhesive for connecting the polyacetal resin molding 10 containing a polyacetal resin to the polyethylene resin molding 20 containing a polyethylene resin.

EXAMPLES

Hereinafter, the present invention will be specifically explained with Examples and Comparative examples, but the present invention is not limited to Examples below.

The materials used in Examples and Comparative examples are as follows.

(A) Polyacetal Resin (A-1) Polyacetal Resin-1

Acetal copolymer having an oxyethylene group content of 3.4 mole based on 100 mole of the oxymethylene group, and MFR (ASTM-D1238 standards: 190° C. and 2.16 kg) of 10 g/10 minutes (A-2) Polyacetal Resin-2

Acetal copolymer having an oxyethylene group content of 1.4 mole based on 100 mole of the oxymethylene group, and MFR (ASTM-D1238 standards: 190° C. and 2.16 kg) of 9.0 g/10 minutes (A-3) Polyacetal Resin-3

Acetal copolymer having an oxyethylene group content of 1.4 mole based on 100 mole of the oxymethylene group, and MFR (ASTM-D1238 standards: 190° C. and 2.16 kg) of 52 g/10 minutes (A-4) Polyacetal Resin-4

Acetal copolymer having an oxyethylene group content of 1.4 mole based on 100 mole of the oxymethylene group, and MFR (ASTM-D1238 standards: 190° C. and 2.16 kg) of 2.5 g/10 minutes (A-5) Polyacetal Resin-5

Acetal copolymer having a oxyethylene group content of 3.4 mole based on 100 mole of the oxymethylene group, and MFR (ASTM-D1238 standards: 190° C. and 2.16 kg) of 27 g/10 minutes Mole number of oxyethylene group per 100 mole of oxymethylene group in polymer: 10 g of the copolymer is put into 100 ml of 3N—HCl aqueous solution, and heated and decomposed at 120° C. for 2 hours in an airtight container. The aqueous solution is cooled, and then measured with gas chromatography (FID), and the content of the oxyethylene group is represented by the mole number with respect to 100 mole of the oxymethylene group of the polymer.

(B) Polyethylene Resin (B-1) Polyethylene Resin-1

Maleic anhydride-modified polyethylene resin having a density of 0.922 g/cm$^3$ (in accordance with JIS K7112), MFR (ASTM-D1238 standards: 190° C. and 2.16 kg) of 0.35 g/10 minutes, and a maleic anhydride modification rate of 0.28 mass %

(B-2) Polyethylene Resin-2

Maleic anhydride-modified polyethylene resin having a density of 0.922 g/cm$^3$ (in accordance with JIS K7112), MFR (ASTM-D1238 standards: 190° C. and 2.16 kg) of 0.24 g/10 minutes, and a maleic anhydride modification rate of 0.64 mass %

(B-3) Polyethylene Resin-3

Maleic anhydride-modified polyethylene resin having a density of 0.954 g/cm$^3$ (in accordance with JIS K7112), MFR (ASTM17-D1238 standards: 190° C. and 2.16 kg) of 0.26 g/10 minutes, and a maleic anhydride modification rate of 0.29 mass %

(B-4) Polyethylene Resin-4

Maleic anhydride-modified polyethylene resin having a density of 0.954 g/cm$^3$ (in accordance with JIS K7112), MFR (ASTM-D1238 standards: 190° C. and 2.16 kg) of 0.17 g/10 minutes, and a maleic anhydride modification rate of 0.54 mass %

(B-5) Polyethylene Resin-5

Maleic anhydride-modified polyethylene resin having a density of 0.925 g/cm$^3$ (in accordance with JIS K7112), MFR (ASTM-D1238 standards: 190° C. and 2.16 kg) of 11.6 g/10 minutes, and a maleic anhydride modification rate of 0.20 mass %

(B-6) Polyethylene Resin-6

Maleic anhydride-modified polyethylene resin having a density of 0.925 g/cm$^3$ (in accordance with JIS K7112), MFR (ASTM-D1238 standards: 190° C. and 2.16 kg) of 9.7 g/10 minutes, and a maleic anhydride modification rate of 0.42 mass %

(B-7) Polyethylene Resin-7

Maleic anhydride-modified polyethylene resin having a density of 0.956 g/cm$^3$ (in accordance with JIS K7112), MFR (ASTM-D1238 standards: 190° C. and 2.16 kg) of 15.9 g/10 minutes, and a maleic anhydride modification rate of 0.21 mass %

(B-8) Polyethylene Resin-8

Maleic anhydride-modified polyethylene resin having a density of 0.956 g/cm$^3$ (in accordance with JIS K7112), MFR (ASTM-D1238 standards: 190° C. and 2.16 kg) of 12.1 g/10 minutes, and a maleic anhydride modification rate of 0.40 mass %

(B-9) Polyethylene Resin-9

Polyethylene resin having a density of 0.922 g/cm$^3$ (in accordance with JIS K7112), MFR (ASTM-D1238 standards: 190° C. and 2.16 kg) of 1.0 g/10 minutes, and a maleic anhydride modification rate of 0 mass %

(B-10) Polyethylene Resin-10

Maleic anhydride-modified polyethylene resin having a density of 0.922 g/cm$^3$ (in accordance with JIS K7112), MFR (ASTM-D1238 standards: 190° C. and 2.16 kg) of 0.9 g/10 minutes, and a maleic anhydride modification rate of 0.28 mass %

(B-11) Polyethylene Resin-11

Maleic anhydride-modified polyethylene resin having a density of 0.922 g/cm$^3$ (in accordance with JIS K7112), MFR (ASTM-D1238 standards: 190° C. and 2.16 kg) of 1.8 g/10 minutes, and a maleic anhydride modification rate of 0.28 mass %

(B-12) Polyethylene Resin-12

Maleic anhydride-modified polyethylene resin having a density of 0.922 g/cm$^3$ (in accordance with JIS K7112), MFR (ASTM-D1238 standards: 190° C. and 2.16 kg) of 2.8 g/10 minutes, and a maleic anhydride modification rate of 0.28 mass %

(B-13) Polyethylene Resin-13

Polyethylene resin having a density of 0.933 g/cm$^3$ (in accordance with JIS K7112), MFR (ASTM-D1238 standards: 190° C. and 2.16 kg) of 0.50 g/10 minutes, and a maleic anhydride modification rate of 0.11 mass %, and consisting of 40 mass % of maleic anhydride-modified polyethylene resin having a density of 0.954 g/cm$^3$ (in accordance with JIS K7112), MFR (ASTM-D1238 standards: 190° C. and 2.16 kg) of 0.26 g/10 minutes, and a maleic anhydride modification rate of 0.29 mass %; 35 mass % of unmodified linear low density polyethylene resin having a density of 0.928 g/cm$^3$ (in accordance with JIS K7112) and MFR (ASTM-D1238 standards: 190° C. and 2.16 kg) of 0.90 g/10 minutes; and 25 mass % of unmodified linear low density polyethylene resin having a density of 0.908 g/cm³ (in accordance with JIS K7112) and MFR (ASTM-D1238 standards: 190° C. and 2.16 kg) of 1.0 g/10 minutes (B-14) Polyethylene Resin-14

Polyethylene resin having a density of 0.933 g/cm³ (in accordance with JIS K7112), MFR (ASTM-D1238 standards: 190° C. and 2.16 kg) of 0.50 g/10 minutes, and a maleic anhydride modification rate of 0.21 mass %, and consisting of 40 mass % of maleic anhydride-modified polyethylene resin having a density of 0.954 g/cm³ (in accordance with JIS K7112), MFR (ASTM-D1238 standards: 190° C. and 2.16 kg) of 0.17 g/10 minutes, and a maleic anhydride modification rate of 0.54 mass %; 35 mass % of unmodified linear low density polyethylene resin having a density of 0.928 g/cm³ (in accordance with JIS K7112) and MFR (ASTM-D1238 standards: 190° C. and 2.16 kg) of 0.90 g/10 minutes; and 25 mass % of unmodified linear low density polyethylene resin having a density of 0.908 g/cm³ (in accordance with JIS K7112) and MFR (ASTM-D1238 standards: 190° C. and 2.16 kg) of 1.0 g/10 minutes Examples 1 to 15 and Comparative Examples 1 to 11

The polyacetal resin (A) and the polyethylene resin (B) indicated in Tables 1 to 4 were mixed at the blending amounts indicated in Tables 1 to 4 with SUPER MIXER manufactured by KAWATA MFG.CO., LTD. to give a mixture, and then this mixture was melting-kneaded with a biaxial extruder ("PCM-30" manufactured by Ikegai Co., Ltd., screw diameter: 30 mm) to perform extrusion, and the strand discharged from the extruder was cooled in a water tank and was cut with a pelletizer to give pellets of the polyacetal resin compositions of Examples 1 to 15 and Comparative examples 1 to 11. Meanwhile, the unit of the blending amount in Tables 1 to 4 is mass %.

<Evaluation for Adhesive Property>

(1) Test 1 for Adhesive Property with Respect to Polyacetal Resin Molding (POM Molding)

The pellets of the polyacetal resin compositions of Examples 1 to 15 and Comparative examples 1 to 11 were injection-molded at a condition of a resin temperature of 240° C. and a die temperature of 40° C. using an injection molding machine (PS-40 manufactured by NISSEI PLASTIC INDUSTRIAL CO., LTD), to give a test film of 123 mm×13 mm×0.8 mm (thickness). A half side (62 mm length) of one surface among both surfaces having the greatest area of the obtained test film was protected with a heat-resistant seal consisting of polyimide having a thickness of 0.03 mm (herein, the surface protected with the heat-resistant seal of the one surface is referred to as the "protected surface 1", and the surface not protected with the heat-resistant seal is referred to as the "non-protected surface 1"). Then, the test film was inserted into the die cavity of 123 min×13 mm×4.0 mm (thickness), and a polyacetal resin (an acetal copolymer having a proportion of the oxyethylene group occupying in the total mass of the oxymethylene group and the oxyethylene group of 1.7 mol, and MFR (ASTM-D1238 standards: 190° C. and 2.16 kg) of 9 g/10 minutes) was introduced to the cavity at a condition of a resin temperature of 230° C. and a die temperature of 120° C., and a polyacetal resin molding was formed on the non-protected surface 1 and the heat-resistant seal of the test film, to give a laminate A.

From the thus-obtained laminate A, the heat-resistant seal was peeled off together with a portion of the polyacetal resin molding formed on the heat-resistant seal. Then, the remaining portion of the polyacetal resin molding formed on the non-protected surface 1 of the test film was fixed at the lower fixture (fixed side) of the tension tester (manufactured by Instron, product name: "5544"), and the test film was fixed at the upper fixture (movable side). Then, the upper fixture was displaced upward, that is, in the vertical direction with respect to the interface of the remaining portion of the polyacetal resin molding and the test film at a speed of 200 mm/min, whereby to separate the test film from the polyacetal resin molding. In other words, 90° peel test between the test film and the polyacetal resin molding was performed. At this time, the maximum tension strength detected with the load cell of the tension tester was defined as the adhesion strength of the test film with respect to the polyacetal resin molding. The results are shown in Tables 1 to 4.

(2) Test 2 for Adhesive Property with Respect to Polyacetal Resin Molding (POM Molding)

A polyacetal resin (an acetal copolymer having a proportion of the oxyethylene group occupying in the total mass of the oxymethylene group and the oxyethylene group of 1.7 mol, and MFR (ASTM-D1238 standards: 190° C. and 2.16 kg) of 9 g/10 minutes) was injection-molded at a condition of a resin temperature of 230° C. and a die temperature of 120° C. using an injection molding machine (PS-40 manufactured by Nissei Resin Industry Co.), to give a polyacetal resin molding of 123 mm×13 mm×3.2 mm (thickness). The half side (62 mm length) of one surface among both surfaces having the greatest area of the obtained polyacetal resin molding was protected with a heat-resistant seal consisting of polyimide having a thickness of 0.03 mm (herein, the surface protected with the heat-resistant seal of the one surface is referred to as the "protected surface 2", and the surface not protected with the heat-resistant seal is referred to as the "non-protected surface 2"). Then, the polyacetal resin molding was inserted into the die cavity of 123 mm×13 mm×4.0 mm (thickness), and the pellets of the polyacetal resin compositions of Examples 1 to 15 and Comparative examples 1 to 11 were introduced to the cavity at a condition of a resin temperature of 230° C. and a die temperature of 120° C., and the test film was formed on the non-protected surface 2 and the heat-resistant seal of the polyacetal resin molding, to give a laminate B.

From the laminate B described above, the heat-resistant seal was peeled off together with a portion of the test film formed thereon. Then, the remaining portion of the test film formed on the non-protected surface 2 of the polyacetal resin molding was fixed at the lower fixture (fixed side) of the tension tester (manufactured by Instron, product name: "5544"), and a polyacetal resin molding was fixed at the upper fixture (movable side). Then, the upper fixture was displaced upward, that is, in the vertical direction with respect to the interface of the remaining portion of the test film and the polyacetal resin molding at a speed of 200 mm/min, whereby to separate the polyacetal resin molding from the test film. In other words, 90° peel test between the test film and the polyacetal resin molding was performed. At this time, the maximum tension strength detected with the load cell of the tension tester was defined as the adhesion strength of the test film with respect to the polyacetal resin molding. The results are shown in Tables 1 to 4.

(3) Test 3 for Adhesive Property with Respect to Polyethylene Resin Molding (PE Molding)

The pellets of the polyacetal resin compositions of Examples 1 to 15 and Comparative examples 1 to 11 were injection-molded at a condition of a resin temperature of 240° C. and a die temperature of 40° C. using an injection molding machine (PS-40 manufactured by NISSEI PLASTIC INDUSTRIAL CO., LTD), to give a test film of 123 mm×13 mm×0.8 mm (thickness). The half side (62 mm length) of one surface among both surfaces having the greatest area of the obtained test film was protected with a heat-resistant seal consisting of polyimide having a thickness of 0.03 mm (herein, the surface protected with the heat-resistant seal of the one surface is referred to as the "protected surface 3", and the surface not protected with the heat-resistant seal is referred to as the "non-protected surface 3"). Then, the test film was inserted into the die cavity of 123 mm×13 mm×4.0 mm (thickness), and a polyethylene resin (manufactured by Japan Polyethylene Corporation, product name: "NOVATEC HD HJ221", having a density of 0.949 g/cm$^3$ (in accordance with JIS K7112), and MFR (ASTM-D1238 standards: 190° C. and 21.6 kg) of 13 g/10 minutes) was introduced to the cavity at a condition of a resin temperature of 230° C. and a die temperature of 120° C., and the polyethylene resin molding was formed on the non-protected surface 3 and the heat-resistant seal of the test film, to give a laminate C.

From the thus-obtained laminate C, the heat-resistant seal was peeled off together with a portion of the polyethylene resin molding formed thereon. Then, the remaining portion of the polyethylene resin molding formed on the non-protected surface 3 of the test film was fixed at the lower fixture (fixed side) of the tension tester (manufactured by Instron, product name: "5544"), and the test film was fixed at the upper fixture (movable side). Then, the upper fixture was displaced upward, that is, in the vertical direction with respect to the interface of the remaining portion of the polyethylene resin molding and the test film at a speed of 200 mm/min, whereby to separate the test film from the polyethylene resin molding. In other words, 90° peel test between the test film and the polyethylene resin molding was performed. At this time, the maximum tension strength detected with the load cell of the tension tester was defined as the adhesion strength of the test film with respect to the polyethylene resin molding. The results are shown in Tables 1 to 4.

(4) Test 4 for Adhesive Property with Respect to Polyethylene Resin Molding (PE Molding)

A polyethylene resin (manufactured by Japan Polyethylene Corporation, product name: "NOVATEC HD HJ221", having a density of 0.949 g/cm$^3$ (in accordance with JIS K7112), and MFR (ASTM-D1238 standards: 190° C. and 21.6 kg) of 13 g/10 minutes) was injection-molded at a condition of a resin temperature of 240° C. and a die temperature of 40° C. using an injection molding machine (PS-40 manufactured by NISSEI PLASTIC INDUSTRIAL CO., LTD), to give a polyethylene resin molding of 123 mm×13 mm×3.2 mm (thickness). The half side (62 mm length) of one surface among both surfaces having the greatest area of the obtained polyethylene resin molding was protected with a heat-resistant seal consisting of polyimide having a thickness of 0.03 mm (herein, the surface protected with the heat-resistant seal of the one surface described above is referred to as the "protected surface 4", and the surface not protected with the heat-resistant seal is referred to as the "non-protected surface 4"). Then, the polyethylene resin molding was inserted into the die cavity of 123 mm×13 mm×4.0 mm (thickness), and the pellets of the polyacetal resin compositions of Examples 1 to 15 and Comparative examples 1 to 11 were introduced to the cavity at a condition of a resin temperature of 230° C. and a die temperature of 120° C., and the test film was formed on the non-protected surface 4 and the heat-resistant seal of the polyethylene resin molding, to give a laminate D.

From the laminate D described above, the heat-resistant seal was peeled off together with a portion of the test film formed thereon. Then, the remaining portion of the test film formed on the non-protected surface 4 of the polyethylene resin molding was fixed at the lower fixture (fixed side) of the tension tester (manufactured by Instron, product name: "5544"), and the polyethylene resin molding was fixed at the upper fixture (movable side). Then, the upper fixture was displaced upward, that is, in the vertical direction with respect to the interface of the remaining portion of the test film and the polyethylene resin molding at a speed of 200 mm/min, whereby to separate the polyethylene resin molding from the test film. In other words, 90° peel test between the test film and the polyethylene resin molding was performed. At this time, the maximum tension strength detected with the load cell of the tension tester was defined as the adhesion strength of the test film with respect to the polyethylene resin molding. The results are shown in Tables 1 to 4.

The passing criteria with respect to the adhesive property was as follows.

Passing criteria: The adhesion strength is 25N or more in any one of the tests 1 to 4 for adhesive property

TABLE 1

| | | | Example 1 | Example 2 | Example 3 | Example 4 | Example 5 | Example 6 | Example 7 | Example 8 |
|---|---|---|---|---|---|---|---|---|---|---|
| Composition | (A) Polyacetal resin | A-1 | 30 | 30 | 30 | 30 | | | | |
| | | A-2 | | | | | | 30 | 45 | 60 |
| | | A-3 | | | | | | | | |
| | | A-4 | | | | | 30 | | | |
| | | A-5 | | | | | | | | |
| | (B) Polyethylene resin | B-1 | 70 | | | | | 70 | 55 | 40 |
| | | B-2 | | 70 | | | | | | |
| | | B-3 | | | 70 | | | | | |
| | | B-4 | | | | 70 | | | | |
| | | B-5 | | | | | | | | |
| | | B-6 | | | | | | | | |
| | | B-7 | | | | | | | | |
| | | B-8 | | | | | | | | |
| | | B-9 | | | | | | | | |
| | | B-10 | | | | | | | | |
| | | B-11 | | | | | | | | |
| | | B-12 | | | | | | | | |
| | | B-13 | | | | | | | | |
| | | B-14 | | | | | | | | |

TABLE 1-continued

|  |  | Example 1 | Example 2 | Example 3 | Example 4 | Example 5 | Example 6 | Example 7 | Example 8 |
|---|---|---|---|---|---|---|---|---|---|
| MFR of (A) Polyacetal resin (g/10 minutes) | | 10 | 10 | 10 | 10 | 2.5 | 9 | 9 | 9 |
| Content of Oxyethylene group of (A) Polyacetal resin (Mole number per 100 mole of Oxymethylene group) | | 3.4 | 3.4 | 3.4 | 3.4 | 1.4 | 3.4 | 3.4 | 3.4 |
| MFR of (B) Polyethylene resin (g/10 minutes) | | 0.35 | 0.24 | 0.26 | 0.17 | 0.35 | 0.35 | 0.35 | 0.35 |
| Modification rate of (B) Polyethylene resin (mass %) | | 0.28 | 0.64 | 0.29 | 0.54 | 0.28 | 0.28 | 0.28 | 0.28 |
| Density of (B) Polyethylene resin (g/cm$^3$) | | 0.922 | 0.922 | 0.954 | 0.954 | 0.922 | 0.922 | 0.922 | 0.922 |
| Test 1 for adhesive property (Test film to POM molding) | Adhesion strength to POM molding (N) | 37 | 29 | 28 | 26 | 46 | 35 | 38 | 40 |
| Test 2 for adhesive property (POM molding to Test film) | Adhesion strength to POM molding (N) | 35 | 27 | 26 | 25 | 40 | 31 | 34 | 37 |
| Test 3 for adhesive property (Test film to PE molding) | Adhesion strength to PE molding (N) | 65 | 61 | 43 | 50 | 52 | 51 | 42 | 37 |
| Test 4 for adhesive property (PE molding to Test film) | Adhesion strength to PE molding (N) | 53 | 50 | 35 | 41 | 43 | 42 | 32 | 26 |

TABLE 2

|  |  |  | Example 9 | Example 10 | Example 11 | Example 12 | Example 13 | Example 14 | Example 15 |
|---|---|---|---|---|---|---|---|---|---|
| Composition | (A) Polyacetal resin | A-1 |  | 30 | 30 |  | 30 |  |  |
|  |  | A-2 |  |  |  | 30 |  | 30 | 35 |
|  |  | A-3 |  |  |  |  |  |  |  |
|  |  | A-4 |  |  |  |  |  |  |  |
|  |  | A-5 | 30 |  |  |  |  |  |  |
|  | (B) Polyethylene resin | B-1 | 70 |  |  |  |  |  |  |
|  |  | B-2 |  |  |  |  |  |  |  |
|  |  | B-3 |  |  |  |  |  |  |  |
|  |  | B-4 |  |  |  |  |  |  |  |
|  |  | B-5 |  |  |  |  |  |  |  |
|  |  | B-6 |  |  |  |  |  |  |  |
|  |  | B-7 |  |  |  |  |  |  |  |
|  |  | B-8 |  |  |  |  |  |  |  |
|  |  | B-9 |  |  |  |  |  |  |  |
|  |  | B-10 |  | 70 |  |  |  |  |  |
|  |  | B-11 |  |  | 70 |  |  |  |  |
|  |  | B-12 |  |  |  |  |  |  |  |
|  |  | B-13 |  |  |  | 70 |  |  |  |
|  |  | B-14 |  |  |  |  | 70 | 70 | 65 |
| MFR of (A) Polyacetal resin (g/10 minutes) | | | 27 | 10 | 10 | 9 | 10 | 9 | 9 |
| Content of Oxyethylene group of (A) Polyacetal resin (Mole number per 100 mole of Oxymethylene group) | | | 3.4 | 3.4 | 3.4 | 3.4 | 3.4 | 3.4 | 3.4 |
| MFR of (B) Polyethylene resin (g/10 minutes) | | | 0.35 | 0.90 | 1.8 | 0.5 | 0.5 | 0.5 | 0.5 |
| Modification rate of (B) Polyethylene resin (mass %) | | | 0.28 | 0.28 | 0.28 | 0.11 | 0.21 | 0.21 | 0.21 |
| Density of (B) Polyethylene resin (g/cm$^3$) | | | 0.922 | 0.922 | 0.922 | 0.933 | 0.933 | 0.933 | 0.933 |
| Test 1 for adhesive property (Test film to POM molding) | Adhesion strength to POM molding (N) | | 26 | 33 | 27 | 35 | 33 | 37 | 39 |
| Test 2 for adhesive property (POM molding to Test film) | Adhesion strength to POM molding (N) | | 25 | 30 | 25 | 32 | 30 | 35 | 36 |
| Test 3 for adhesive property (Test film to PE molding) | Adhesion strength to PE molding (N) | | 64 | 59 | 57 | 57 | 59 | 61 | 55 |
| Test 4 for adhesive property (PE molding to Test film) | Adhesion strength to PE molding (N) | | 53 | 49 | 48 | 48 | 49 | 50 | 45 |

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Composition | (A) Polyacetal resin | A-1 | 30 | 30 | 30 | 30 | 55 | 30 |
|  |  | A-2 |  |  |  |  |  |  |
|  |  | A-3 |  |  |  |  |  |  |
|  |  | A-4 |  |  |  |  |  |  |
|  |  | A-5 |  |  |  |  |  |  |
|  | (B) Polyethylene resin | B-1 |  |  |  |  |  |  |
|  |  | B-2 |  |  |  |  |  |  |

TABLE 3-continued

|  |  | Comparative Example 1 | Comparative Example 2 | Comparative Example 3 | Comparative Example 4 | Comparative Example 5 | Comparative Example 6 |
|---|---|---|---|---|---|---|---|
|  | B-3 |  |  |  |  |  |  |
|  | B-4 |  |  |  |  |  |  |
|  | B-5 | 70 |  |  |  |  |  |
|  | B-6 |  | 70 |  |  |  |  |
|  | B-7 |  |  | 70 |  |  |  |
|  | B-8 |  |  |  | 70 | 45 |  |
|  | B-9 |  |  |  |  |  | 70 |
|  | B-10 |  |  |  |  |  |  |
|  | B-11 |  |  |  |  |  |  |
|  | B-12 |  |  |  |  |  |  |
| MFR of (A) Polyacetal resin (g/10 minutes) |  | 10 | 10 | 10 | 10 | 10 | 10 |
| Content of Oxyethylene group of (A) Polyacetal resin (Mole number per 100 mole of Oxymethylene group) |  | 3.4 | 3.4 | 3.4 | 3.4 | 3.4 | 3.4 |
| MFR of (B) Polyethylene resin (g/10 minutes) |  | 11.6 | 9.7 | 15.9 | 12.1 | 12.1 | 1.0 |
| Modification rate of (B) Polyethylene resin (mass %) |  | 0.20 | 0.42 | 0.21 | 0.40 | 0.40 | 0.00 |
| Density of (B) Polyethylene resin (g/cm$^3$) |  | 0.925 | 0.925 | 0.956 | 0.956 | 0.956 | 0.922 |
| Test 1 for adhesive property (Test film to POM molding) | Adhesion strength to POM molding (N) | 16 | 15 | 0 | 0 | 14 | 11 |
| Test 2 for adhesive property (POM molding to Test film) | Adhesion strength to POM molding (N) | 9 | 9 | 0 | 0 | 7 | 5 |
| Test 3 for adhesive property (Test film to PE molding) | Adhesion strength to PE molding (N) | 53 | 55 | 129 | 123 | 45 | 68 |
| Test 4 for adhesive property (PE molding to Test film) | Adhesion strength to PE molding (N) | 43 | 43 | 118 | 113 | 31 | 59 |

TABLE 4

|  |  |  | Comparative Example 7 | Comparative Example 8 | Comparative Example 9 | Comparative Example 10 | Comparative Example 11 |
|---|---|---|---|---|---|---|---|
| Composition | (A) Polyacetal resin | A-1 | 100 |  |  | 4 | 30 |
|  |  | A-2 |  |  |  |  |  |
|  |  | A-3 |  |  | 30 |  |  |
|  |  | A-4 |  |  |  |  |  |
|  |  | A-5 |  |  |  |  |  |
|  | (B) Polyethylene resin | B-1 |  | 100 | 70 | 96 |  |
|  |  | B-2 |  |  |  |  |  |
|  |  | B-3 |  |  |  |  |  |
|  |  | B-4 |  |  |  |  |  |
|  |  | Bo |  |  |  |  |  |
|  |  | B-6 |  |  |  |  |  |
|  |  | B-7 |  |  |  |  |  |
|  |  | B-8 |  |  |  |  |  |
|  |  | B-9 |  |  |  |  |  |
|  |  | B-10 |  |  |  |  |  |
|  |  | B-11 |  |  |  |  |  |
|  |  | B-12 |  |  |  |  | 70 |
| MFR of (A) Polyacetal resin (g/10 minutes) |  |  | 10 | — | 52 | 10 | 10 |
| Content of Oxyethylene group of (A) Polyacetal resin (Mole number per 100 mole of Oxymethylene group) |  |  | 3.4 | — | 1.4 | 3.4 | 3.4 |
| MFR of (B) Polyethylene resin (g/10 minutes) |  |  | — | 0.35 | 0.35 | 0.35 | 2.8 |
| Modification rate of (B) Polyethylene resin (mass %) |  |  | — | 0.28 | 0.28 | 0.28 | 0.28 |
| Density of (B) Polyethylene resin (g/cm$^3$) |  |  | — | 0.922 | 0.922 | 0.922 | 0.922 |
| Test 1 for adhesive property (Test film to POM molding) | Adhesion strength to POM molding (N) |  | 620 | 0 | 17 | 5 | 17 |
| Test 2 for adhesive property (POM molding to Test film) | Adhesion strength to POM molding (N) |  | 620 | 0 | 10 | 0 | 10 |
| Test 3 for adhesive property (Test film to PE molding) | Adhesion strength to PE molding (N) |  | 0 | 140 | 72 | 123 | 55 |
| Test 4 for adhesive property (PE molding to Test film) | Adhesion strength to PE molding (N) |  | 0 | 140 | 59 | 120 | 43 |

From the results shown in Tables 1 to 4, any polyacetal resin composition obtained in Examples 1 to 15 met the passing criteria with respect to the adhesive property. On the contrary, each of the polyacetal resin compositions obtained in Comparative examples 1 to 11 did not meet the passing criteria with respect to the adhesive property.

Accordingly, it was confirmed that the polyacetal resin composition of the present invention has excellent adhesive property with respect to any one of the polyacetal resin molding containing a polyacetal resin and the polyethylene resin molding containing a polyethylene resin.

EXPLANATIONS OF REFERENCE NUMERALS

10 Polyacetal resin molding
20 Polyethylene resin molding
30 Intermediate layer
100 Composite molding

The invention claimed is:

1. A method of producing a composite molding having a polyacetal resin molding comprising a polyacetal resin, a polyethylene resin molding containing a polyethylene resin, and an intermediate layer provided between the polyacetal resin molding and the polyethylene resin molding, wherein the intermediate layer consists of a polyacetal resin composition consisting essentially of a polyacetal resin (A) and a polyethylene resin (B), and wherein the blending proportion of the polyacetal resin (A) occupying in the total mass of the polyacetal resin (A) and the polyethylene resin (B) is 10 to 90 mass %, a melt flow rate of the polyacetal resin (A) measured at a condition of 190° C. and 2.16 kg load is 30 g/10 minutes or less, and the polyethylene resin (B) contains a modified polyethylene resin and a modification rate is 0.01 mass % or more based on 100 mass % of the total mass of the polyethylene resin (B), and a melt flow rate of the polyethylene resin (B) measured at a condition of 190° C. and 2.16 kg load is 2.5 g/10 minutes or less, the method comprising:

a first process of preparing the intermediate layer, a second process of preparing the polyacetal resin molding and a third process of preparing the polyethylene resin molding, and produces the composite molding through the first process, the second process and the third process.

2. The method of producing the composite molding according to claim 1, wherein the first process is performed before the second process and the third process, the second process is a process of preparing the polyacetal resin molding by bringing the polyacetal resin in molten state into contact with the intermediate layer to form the polyacetal resin molding on the intermediate layer, and the third process is a process of preparing the polyethylene resin molding by bringing the polyethylene resin in molten state into contact with the intermediate layer to form the polyethylene resin molding on the intermediate layer.

3. The method of producing the composite molding according to claim 2, wherein the first process, the second process and the third process are performed by a three-color molding or an insert molding.

* * * * *